United States Patent
Preusser et al.

(10) Patent No.: US 9,301,258 B2
(45) Date of Patent: Mar. 29, 2016

(54) GEOPHYSICAL DATA ACQUISITION AND POWER TRANSFER METHOD APPARATUS AND SYSTEM

(71) Applicant: CGG SERVICES SA, Massy Cedex (FR)

(72) Inventors: Thomas Preusser, Calgary (CA); Peter Maxwell, Missouri City, TX (US); Jason Jurok, Crossfield (CA)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 14/048,440

(22) Filed: Oct. 8, 2013

(65) Prior Publication Data
US 2014/0310433 A1 Oct. 16, 2014

Related U.S. Application Data

(60) Provisional application No. 61/810,386, filed on Apr. 10, 2013, provisional application No. 61/810,382, filed on Apr. 10, 2013.

(51) Int. Cl.
*G06F 3/00* (2006.01)
*G06F 11/00* (2006.01)
*H04W 52/02* (2009.01)
*H04W 4/00* (2009.01)

(52) U.S. Cl.
CPC .......... *H04W 52/0261* (2013.01); *H04W 4/006* (2013.01)

(58) Field of Classification Search
None
See application file for complete search history.

(56) References Cited

U.S. PATENT DOCUMENTS

| | | | | |
|---|---|---|---|---|
| 7,526,944 B2 * | 5/2009 | Sabata et al. | ................... | 73/49.1 |
| 7,646,670 B2 | 1/2010 | Maxwell et al. | | |
| 8,180,595 B2 * | 5/2012 | Daniels et al. | ................ | 702/188 |
| 2002/0128051 A1 * | 9/2002 | Liebenow | ..................... | 455/574 |
| 2004/0233043 A1 * | 11/2004 | Yazawa et al. | ............... | 340/10.3 |

(Continued)

FOREIGN PATENT DOCUMENTS

| | | |
|---|---|---|
| FR | 2 904 118 A1 | 1/2008 |
| GB | 2466560 B | 3/2011 |
| WO | 2012/009034 A1 | 1/2012 |

OTHER PUBLICATIONS

Mesa Systems Co., "Inductive Power/Data Coupling Devices, MESA Air-Gap Inductive Power Coupling Devices—with and without Data Communications", downloaded from the internet Oct. 17, 2014 (http://www.mesasystemsco.com/category.php?cat=2).

(Continued)

*Primary Examiner* — David E Martinez
(74) *Attorney, Agent, or Firm* — Patent Portfolio Builders PLLC

(57) ABSTRACT

System, apparatus and method for collecting data from, and providing power to, a geophysical data acquisition device are described herein. The method may include charging a data transfer device comprising a data transfer port, a power transfer port and a battery module, coupling the data transfer device to a geophysical data acquisition device, deploying the geophysical data acquisition device and collecting data therewith, collecting data from the geophysical data acquisition device via the data transfer port and providing power to the geophysical data acquisition device via the power transfer port, replacing the data transfer device with a charged device, coupling the data transfer device to a charging station, transferring data from the data transfer device, and transferring power to the data transfer device via the charging station.

15 Claims, 13 Drawing Sheets

(56) References Cited

U.S. PATENT DOCUMENTS

| | | |
|---|---|---|
| 2008/0062815 A1 | 3/2008 | Iseli |
| 2008/0114548 A1 | 5/2008 | Pavel et al. |
| 2009/0225629 A1* | 9/2009 | Ray .................... G01V 1/223 367/77 |
| 2010/0156193 A1 | 6/2010 | Rhodes et al. |
| 2011/0074349 A1* | 3/2011 | Ghovanloo .................. 320/108 |
| 2012/0008460 A1 | 1/2012 | Crice |
| 2013/0058192 A1 | 3/2013 | Gateman et al. |
| 2013/0176817 A1 | 7/2013 | Crice |

OTHER PUBLICATIONS

Office Action in corresponding European Application No. EP 14 18 5962.9 dated Nov. 20, 2015.

* cited by examiner

GEOPHYSICAL DATA ACQUISITION AND POWER TRANSFER METHOD APPARATUS AND SYSTEM

CROSS REFERENCE TO RELATED APPLICATIONS

This application claims priority and benefit from U.S. Provisional Patent Application No. 61/810,382, filed Apr. 10, 2013, for "INDUCTIVE POWER AND DATA TRANSFER FOR MARINE OR LAND ACQUISITION SYSTEMS" and U.S. Provisional Patent Application No. 61/810,386, filed Apr. 10, 2013, for "EXTENSION TO INDUCTIVE POWER FOR LAND AND MARINE ACQUISITION SYSTEMS", the entire contents of which are incorporated in their entirety herein by reference.

BACKGROUND

1. Technical Field

Embodiments of the subject matter disclosed herein generally relate to the field of geophysical data acquisition and aggregation. In particular, the embodiments disclosed herein relate to a modular autonomous geophysical data recording device and a method and system for collecting data from, and providing power to, such devices.

2. Discussion of the Background

Geophysical data is useful for a variety of applications such as weather and climate forecasting, environmental monitoring, agriculture, mining, and seismology. As the economic benefits of such data have been proven, and additional applications for geophysical data have been discovered and developed, the demand for localized, high-resolution, and cost-effective geophysical data has greatly increased. This trend is expected to continue.

For example, conventional seismic imaging systems typically record narrow azimuth data. However, complex geological formations, such as the salt bodies of the Gulf of Mexico, have resulted in the need of more sophisticated seismic images.

A current solution is the use of all-azimuth illumination and data acquisition. One example of all-azimuth seismic data acquisition uses autonomous seismometer nodes. In a typical application, the nodes are battery-powered with precise clocks for time synchronization. The nodes may remain on the seafloor or on land for an extended period of time for the recording of acoustic waves coming from a source and energy that is reflected from subsurface formations.

Autonomous seismometer nodes such as those described in U.S. Pat. No. 7,646,670, which is incorporated herein by reference, are essentially self-contained recording stations comprising sensors, a recording unit, a reference clock, and a power source. Seismometer nodes may be deployed in areas where streamers or cabled systems are impractical. Some are intended for long term autonomous acquisition for up to 6 months. Data are typically accessed after recovery of the units.

Seismometer nodes can be used for passive seismic monitoring or for recording seismic energy generated by acoustic sources. The latter method can be used for oil and gas exploration, or for production monitoring. The seismometer nodes may be retrieved, at which time, the data are downloaded and batteries may be replaced or recharged for the next deployment. However, replacing or recharging the seismometers in the field and extracting the data therefrom slow down the costly retrieval process, particularly for ocean bottom surveys.

Similar to seismometers, other geophysical sensing units are often placed in locations that are remote and difficult to reach, such as mountainous regions, glacial regions, jungles, forests, underground mines, downhole locations, and underwater. Direct radio or satellite communications to such locations may not be possible or cost effective. Installing and maintaining data collection cables is also costly and may be impractical in some environments. Consequently, many deployed geophysical sensing units are autonomous units that are powered by batteries and require retrieving or exchanging the sensing unit, in order to recharge the batteries and extract the geophysical data record therein.

The need to retrieve or exchange geophysical sensing units typically requires acquiring a large number of redundant geophysical sensing units—which can be quite costly. Furthermore, each newly deployed geophysical sensing unit may need to be set up with various parameters by a technician (e.g. the precise geophysical location, elevation, or depth of the device), and tested at the deployed location, in order to ensure that the required geophysical data is properly acquired and recorded by the device.

Given the foregoing, a different approach is warranted. Specifically, methods and means are needed to provide power to and extract data from geophysical sensing units without removing those units from their deployed locations.

SUMMARY

As detailed herein, a method for collecting data from, and providing power to, a geophysical data acquisition device includes charging a data transfer device comprising a data transfer port, a power transfer port and a battery module, coupling the data transfer device to a geophysical data acquisition device, deploying the geophysical data acquisition device and collecting data therewith, collecting data from the geophysical data acquisition device via the data transfer port and providing power to the geophysical data acquisition device via the power transfer port. In some embodiments, the data transfer port and the power transfer port are the same port. The ports may be wireless ports such as inductively-coupled ports that transfer power and/or data via a modulated magnetic field.

The method may also include replacing the data transfer device with a newly charged data transfer device, coupling the data transfer device to a charging station, transferring data from the data transfer device, and transferring power to the data transfer device, via the charging station.

An apparatus and system corresponding to the above method are also described herein. The method, system and apparatus described herein may be used to simplify data retrieval and recharging or replacing batteries of geophysical data acquisition devices such as autonomous seismic nodes.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As used herein, the term "coupling" refers to pairing two devices proximate to each other in order to facilitate data and/or power transfer between the devices. Coupling may include, but does not require, a physical binding of the two devices.

As detailed herein, a novel system for collecting data from, and providing power to, a geophysical data acquisition device may leverage a data transfer device as an intermediary device in order to transfer power from a charging station to the geophysical data acquisition device, and to transfer data from the geophysical data acquisition device to the charging station. The use of such an intermediary device may reduce the number of geophysical data acquisition devices needed to conduct a survey in that redundant geophysical data acquisition devices that previously may have been needed for charging purposes are not required. Furthermore, the data retrieval process is simplified in that data retrieval may be automatically accomplished as a background task concurrent with the charging process.

Figure 1:
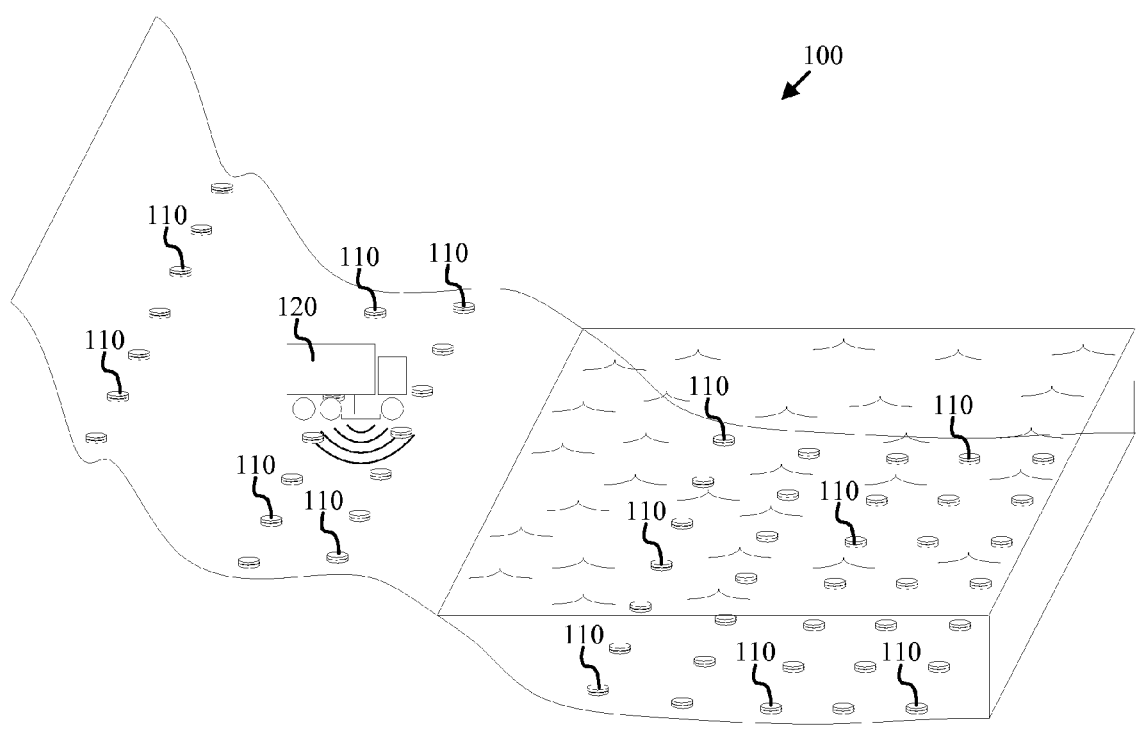
FIG. 1 is a schematic diagram depicting a survey environment wherein various embodiments presented herein may be deployed.

FIG. 1 is a schematic diagram depicting a geophysical survey environment (100) wherein various embodiments presented herein may be deployed. Within the geophysical survey environment (100), a number of autonomous nodes (or alternately geophysical sensing nodes) (110) may be deployed to collect geophysical data. The embodiments presented herein facilitate retrieving data from, and providing power to, geophysical sensing units such as the autonomous nodes (110). In the depicted embodiment, the autonomous nodes (110) acquire geophysical data in response to environmental seismic sources (not shown) or induced seismic sources such as the seismic source (120). Autonomous nodes 110 may include a hydrophone, accelerometer, geophone, particle motion sensor, pressure gradient sensor, or a combination thereof. A seismic source (120) may include a vibrator, explosive, air-gun, or a combination thereof. Although the geophysical survey depicted in FIG. 1 is a seismic survey, the invention is not limited to seismic surveys.

Figure 2A:
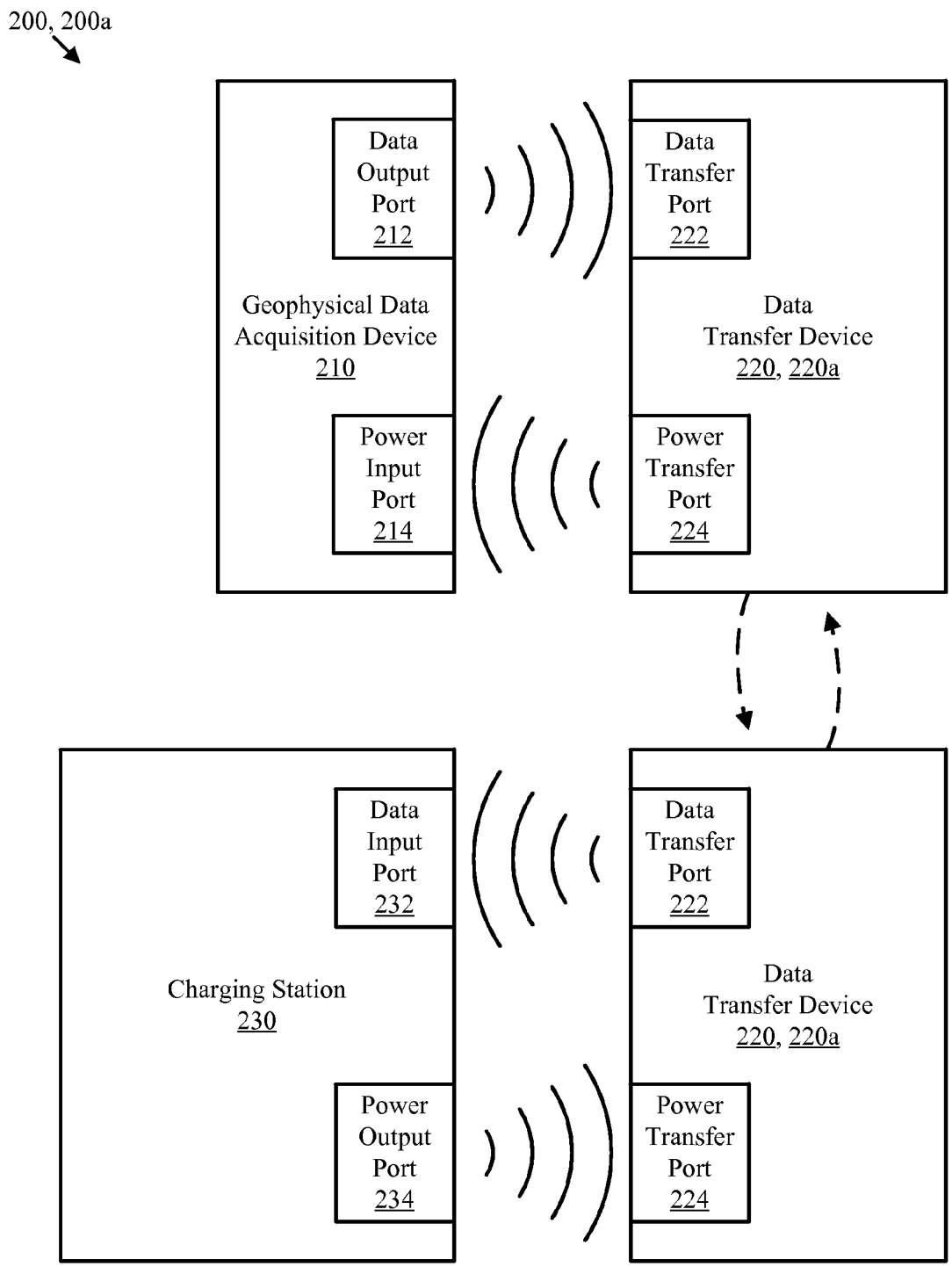
FIGS. 2a-2c are block diagrams depicted several embodiments of a geophysical data acquisition and power transfer system.
Figure 2B:
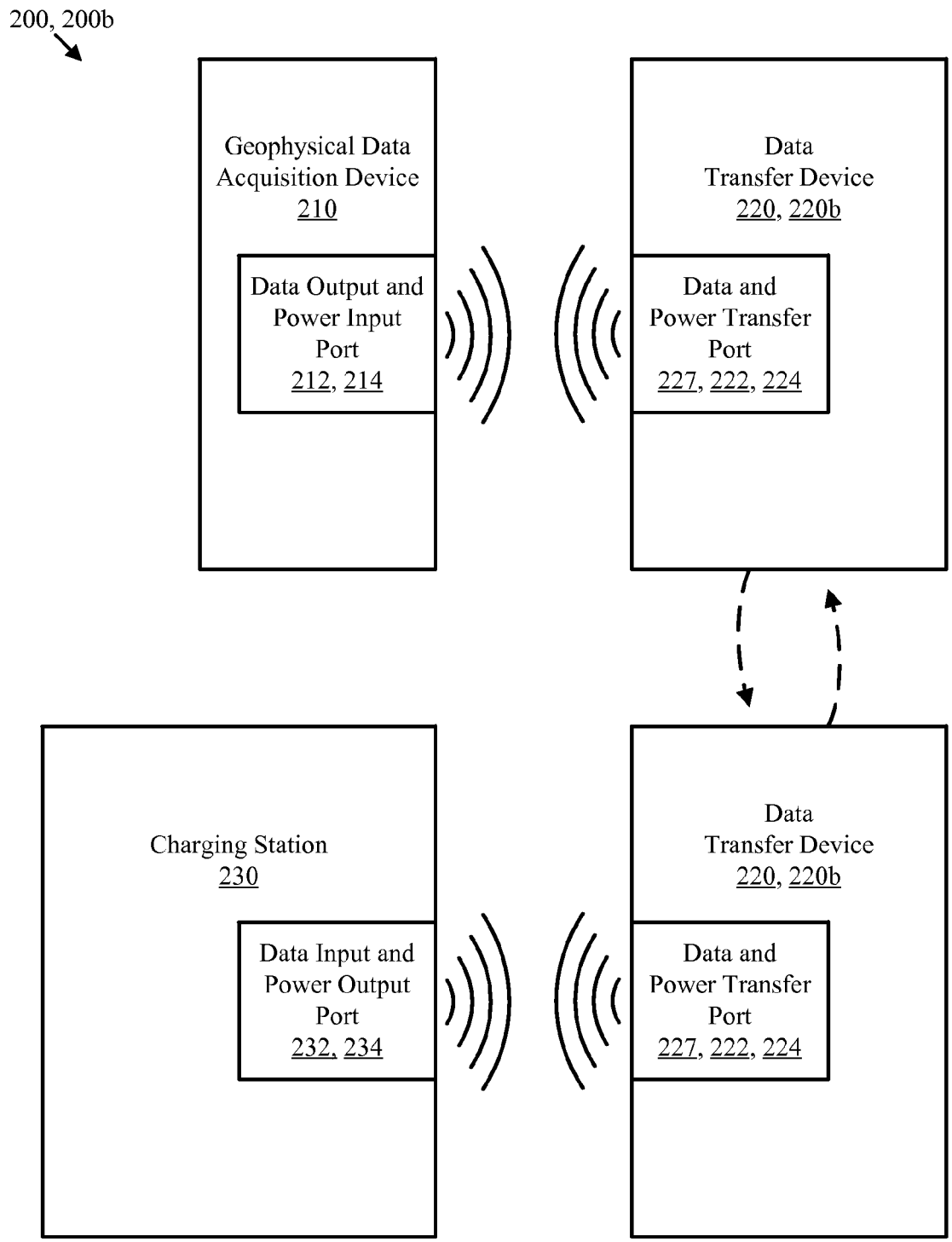
Figure 2C:
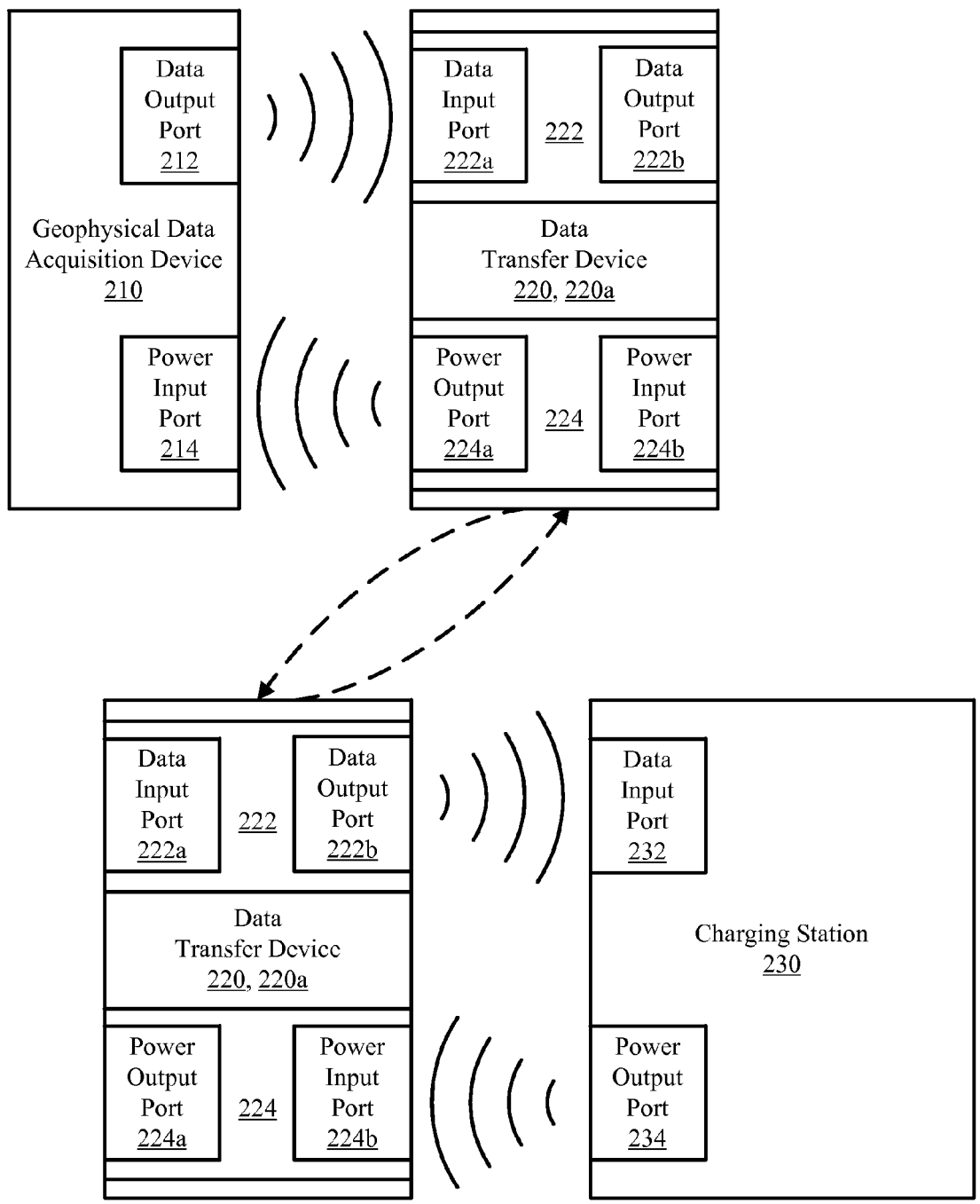

FIGS. 2a-2c are block diagrams depicting several embodiments (200a-c) of a geophysical data acquisition and power transfer system (200). As depicted, the geophysical data acquisition and power transfer system (200) includes geophysical data acquisition devices (210), data transfer devices (220) and one or more charging stations (230). For purposes of simplicity, a single geophysical data acquisition device (210) and a single charging station (230) is shown in each of the figures along with two data transfer devices (220) that may be swapped to facilitate data transfer and power transfer between each geophysical data acquisition device (210) and a charging station (230).

The data transfer devices (220) may be charged at a charging station (230) by coupling (i.e., placing in close proximity) a power transfer port (224) of the transfer device (220) to a power output port (234) of a charging station (230). Similarly, data may be transferred from the transfer device (220) to the charging station (230) by coupling the data transfer port (222) to the data input port (232).

In a similar manner, data may be transferred from the geophysical data acquisition device (210) to the data transfer device (220) by coupling the data transfer port (222) to the data output port (212) of the geophysical data acquisition device (210) and power may be transferred from the data transfer device (220) to the geophysical data acquisition device (210) by coupling the power transfer port (224) of the data transfer device (220) to the power input port (214) of the geophysical data acquisition device (210). The closeness required for effective coupling that facilitates data and power transfer may be dependent on the technology used for data transfer and power transfer. For example, inductively-coupled wireless ports may require a closer proximity than RF wireless ports.

With each device in the depicted system (200), the simultaneous transfer of data and power may occur in that the data ports and the power ports of each device may be simultaneously coupled. FIG. 2a depicts an embodiment (200a) in which the data transfer device (220) has one bidirectional port (222) for data transfer and one bidirectional port (224) for power transfer. FIG. 2b depicts an embodiment (200b) in which the ports (222 and 224) are combined in the data transfer device 220 to provide a single bidirectional port (227) for both power and data transfer. In contrast, FIG. 2c depicts an embodiment (200c) in which the ports (222 and 224) on the data transfer device 220 are partitioned into two unidirectional ports (222a and 222b) for data transfer and two unidirectional ports (224a and 224b) for power transfer. In each of the FIGS. 2a-2c the data and power ports on the data acquisition devices (210) and the charging stations (230) are appropriately configured to couple to the depicted configurations of the respective data transfer devices (220).

In the depicted embodiments, the various ports may be wireless ports, such as RF ports (e.g., WiFi, Microwave, Radio ports), optical ports (e.g., IR, Visible, or UV ports), sonically driven ports, or inductively-coupled ports. One of skill in the art will appreciate that the transfer of data and/or power for many of these various wireless ports occurs via a modulated electric or magnetic field. The ports may transmit both data and power, or they may be separated into dedicated power transmission ports and data transmission ports. For example, power transfer may occur via an inductively-coupled port and data could be transmitted by other means, e.g., Wi-Fi, short range wireless, sonic, or optical means. One of skill in the art will also appreciate that the embodiments 200*a-c* are representative examples of wireless power and data transfer and that other configurations are achievable and may be desirable for particular applications.

Figure 3:
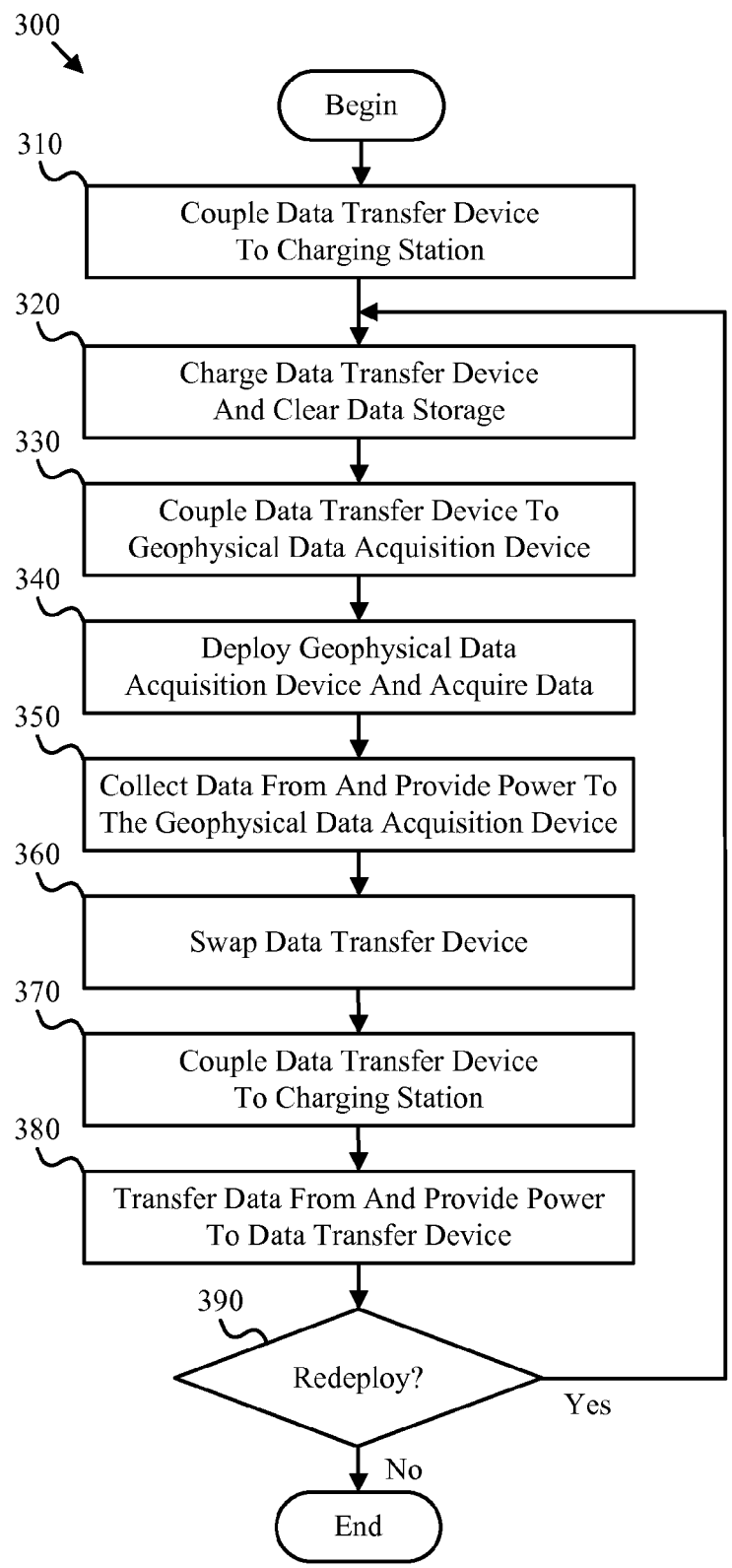
FIG. 3 is a flowchart diagram of a geophysical data acquisition and power transfer method.

FIG. 3 is a flowchart diagram of a geophysical data acquisition and power transfer method (300). As depicted, the geophysical data acquisition and power transfer method (300) includes coupling (310) a data transfer device to a charging station, charging (320) the data transfer device, coupling (330) the data transfer device to a geophysical data acquisition device, deploying (340) the geophysical data acquisition device and acquiring data therewith, collecting (350) data from and providing power to the geophysical data acquisition device, swapping (360) the data transfer device for a newly charged data transfer device, coupling (370) the power-exhausted data transfer device to a charging station, transferring (380) data from and providing power to the exhausted data transfer device and ascertaining (390) whether the data transfer device is to be redeployed. The depicted geophysical data acquisition and power transfer method (300) may be conducted in conjunction with the survey environments (100) and the various embodiments of geophysical data acquisition and power transfer system (200).

Coupling (310) a data transfer device to a charging station may include attaching a data transfer device (220) to a charging station (230) or placing the device (220) adjacent to the charging station (230) such that the power output port (234) of the charging station (230) is proximate to the power transfer port (224) of the data transfer device (220) and wireless power transfer and data transfer may occur. Coupling (310) may, or may not, include physically coupling the data transfer device to the charging station (230).

Charging (320) the data transfer device may include providing power to the data transfer device (220) until a battery contained therein is fully charged. In conjunction with charging (320) the data transfer device, a data transfer memory (226) associated with the device (see FIGS. 6*a-c*) may be cleared or erased.

Coupling (330) the data transfer device to a geophysical data acquisition device may include attaching the data transfer device (220) to a geophysical data acquisition device (210) or placing the device (220) adjacent to the geophysical data acquisition device (210) such that the power input port (214) of the geophysical data acquisition device (210) is proximate to the power transfer port (224) of the data transfer device (220) and that the data output port (212) of the geophysical data acquisition device (210) is proximate to the data transfer port (222) of the data transfer device (220). Coupling (330) may also include, but does not require, physically binding the devices (210 and 220) together to avoid device separation during deployment.

Deploying (340) the geophysical data acquisition device and acquiring data therewith may include deploying the coupled data transfer device (220) and geophysical data acquisition device (210) as a modular and autonomous seismic node (110) within a survey environment such as the survey environment (100) depicted in FIG. 1. The deploying operation 340 may also include acquiring measurements provided by one or more geophysical sensors integral to, or attached to, the geophysical data acquisition device (210).

In some situations, the coupling operation (330) may be deferred until after the deploying operation (340). For example, if the geophysical data acquisition device (210) is equipped with its own power source and internal memory (which may not be the case is some embodiments) and is thereby able to operate independently without the data transfer device (220), and the power source of the device (210) is not exhausted, the coupling operation (330) may be deferred until power transfer and/or data transfer is required (e.g., at step 350).

Collecting (350) data from and providing power to the geophysical data acquisition device may include transferring geophysical data from the geophysical data acquisition device (210) to the data transfer device (220) and transferring power from the data transfer device (220) to the geophysical data acquisition device (210). Data may be transferred by the data transfer port (222) of the data transfer device (220) and power may be transferred by the power transfer port (224). The transfer of data and power may occur while the data transfer device (220) is coupled to the geophysical data acquisition device (210) and may occur concurrently or sequentially. Data corresponding to a single channel or multiple channels may be transferred as it is acquired, or transferred in bursts, from the geophysical data acquisition device (210) to the data transfer device (220). Data checksums or handshaking confirmation packets may be transferred as a safeguard to data loss.

Swapping (360) the data transfer device for a newly charged data transfer device may include retrieving or accessing the coupled data transfer device and geophysical data acquisition device and replacing the data transfer device (220) that may be partially or fully exhausted of power with a newly charged data transfer device (220). In some embodiments, where the geophysical data acquisition device (210) is able to operate independently without the data transfer device (220), replacing the data transfer device (220) may be deferred until power transfer and/or data transfer is required (e.g., when cycling to step 350). In such situations, the swapping operation (360) may be conducted in two stages and data transfer device (220) may be retrieved without immediate replacement.

Coupling (370) the power-exhausted data transfer device to a charging station may include repeating essentially the same steps as described in the coupling operation (310). Transferring (380) data from and transferring power to the power-exhausted data transfer device may include transferring the geophysical data that was collected from the geophysical data acquisition device (210) to the charging station (230) to facilitate seismic analysis. Furthermore, power may be simultaneously transferred from the charging station (230) to the power-exhausted data transfer device (220).

Ascertaining (390) whether the data transfer device is to be redeployed may include determining whether a survey is to be continued. If the data transfer device is to be redeployed, the method may loop to the charging operation (320). Otherwise the method may terminate or exit.

Figure 4:
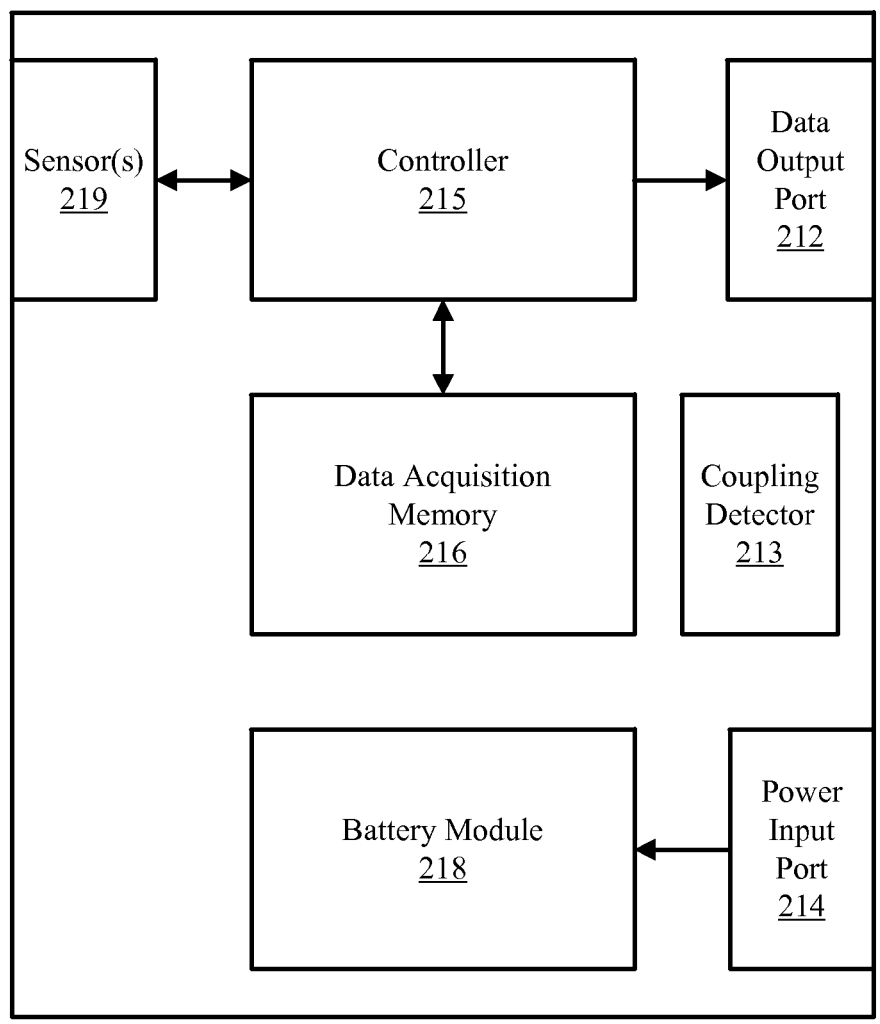
FIG. 4 is a block diagram depicting one embodiment of a geophysical data acquisition device.

FIG. 4 is a block diagram depicting one embodiment of a geophysical data acquisition device (210). As depicted, the geophysical data acquisition device (210) includes a data output port (212), a coupling detector (213), a power input port (214), a controller (215), a data acquisition memory (216), a battery module (218) and one or more sensors (219). FIG. 4 provides additional details on the geophysical data acquisition device (210) over those shown in previous figures.

The sensors (219) may provide seismic sensor data that facilitates seismic processing. The data acquisition memory (216) may be used to store the seismic sensor data provided by the sensors (219) and retrieve that data for transmission by the data output port (212). Sensor data corresponding to a single data channel or multiple data channels may be stored in the data acquisition memory (216).

The data output port (212) may enable transmission/extraction of the geophysical data recorded by the device (210) within the data acquisition memory (216). The data output port (212) is preferably a wireless port, which does not require direct electrical connectivity with an external port in order to operate. Eliminating the need for direct electrical connectivity may increase the reliability of the geophysical data acquisition device (210) and enable deployment in harsh environments. In one embodiment, the data output port is an RF port. In another embodiment, the data output port (212) is an inductively-coupled port that encodes data by modulating a magnetic flux emitted by the port (212).

The power input port (214) may enable providing power to the device (210). In one embodiment, the power input port (214) is an inductively-coupled port that converts an alternating magnetic flux into an AC or DC supply voltage and/or current. In some embodiments, the data output port (212) and the power input port (214) are combined into a common port (see FIG. 2b). For example, both power and data could be transferred by amplitude, frequency, or phase modulation of an alternating magnetic flux on a common inductive port.

The coupling detector (213) may detect when the data output port (212) and/or the power input port (214) are coupled to corresponding ports on a data transfer device (220) or the like. The coupling detector (213) may alert the controller (215) when such a coupling occurs. In one embodiment, the coupling detector (213) includes a resonator that responds to electromagnetic energy corresponding to a wireless or inductive energy carrier frequency and a threshold circuit that detects when a voltage level within the resonator exceeds a selected level.

The controller (215) may be a microcontroller, an embedded state machine, or the like. The controller (215) may initialize the components of the geophysical data acquisition device (210) and respond to interrupts generated by those components. For example, the controller (215) may respond to an interrupt generated by the coupling detector (213) indicating that a coupling event has occurred, by the data output port (212) indicating that a data transmission event has completed, or by the sensor(s) (219) indicating that seismic sensor data is available for storage. In response to such events, the controller (215) may execute specific functions such as storing and retrieving data. The controller (215) may monitor and optimize power transfer through the power input port (214) and data flow rates through the data output port (212).

The battery module (218) may be used to accumulate power provided by the power input port (214) and provide power to the device (210) when power is not available from the power input port (214). In some embodiments, the battery module (218) is a redundant source of power. In other embodiments, the battery module (218) is omitted from the geophysical data acquisition device (210).

The reader may appreciate that the architecture of the geophysical data acquisition and power transfer system (200) and the geophysical data acquisition device (210) enables a number of variations in order and timing of the geophysical data acquisition and power transfer method (300) depicted in FIG. 3. For example, in some embodiments the data acquisition devices (210) may be battery-free devices that need to be coupled to data transfer devices (220) in order to collect geophysical data. In such embodiments, the coupling operation (330) may encompass the deployment operation (340) and the collection operation (350).

In other embodiments, where the data acquisition devices (210) are battery-equipped devices that can operate independently without being coupled to a data transfer device (220), the coupling operation (330) may be limited to a certain interval or duration that is sufficient to transfer data from, and power to, the data acquisition devices (210). For example, on a land survey one or more technicians may visit each of the deployed data acquisition devices (210) and attach the data transfer devices (220) thereto. Subsequently—perhaps later that day after the data acquisition devices (210) are fully charged—the technicians may revisit the deployed data acquisition devices 210 to retrieve the data transfer devices (220).

Figure 9:
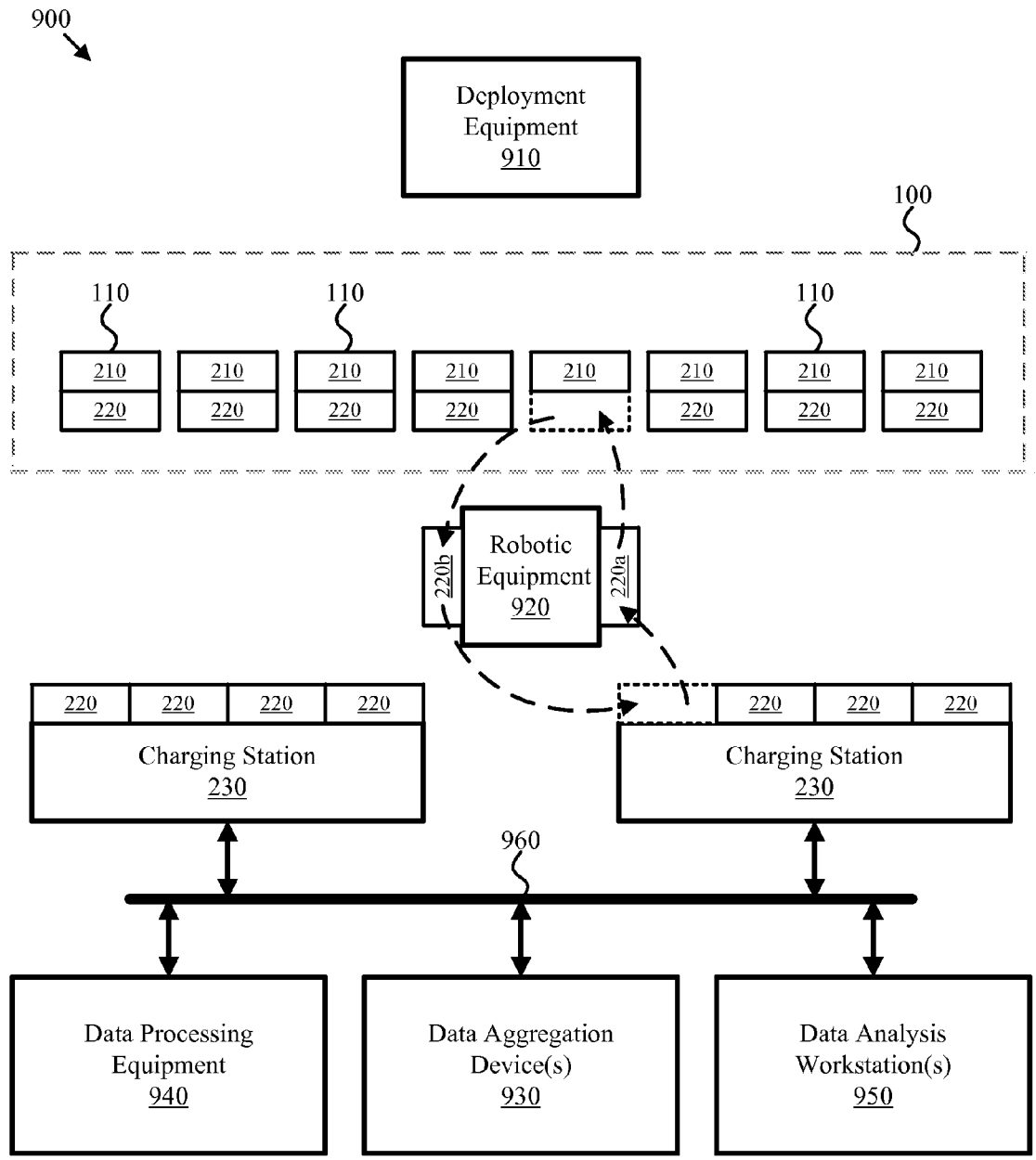
FIG. 9 is a block diagram of a deployment and maintenance system for geophysical sensing.

The architecture and devices presented herein also enable the recording of large volumes of data and efficient uploading to a charging station (230) and/or centralized aggregation or analysis server (see FIG. 9). For example, one or more charging stations (230) may be equipped to concurrently couple with a large number of data transfer devices (220), each of which may burst their recorded data from non-volatile memory such as flash memory. The data transfer devices may be optimized for data and power transfer, yet remain much less costly than an entire geophysical sensing unit. Consequently, the sustainable data transfer rate of the complete data aggregation system may be quite high while reducing costs over conventional solutions. Furthermore, in some embodiments (see FIGS. 2c and 6c), the architecture of the ports on the data transfer device (220) enables simultaneous coupling of the data transfer device (220) to the geophysical data acquisition device (210) and the charging station (230). Simultaneous coupling may be desirable when both the data transfer device (220) and the geophysical data acquisition device (210) may need their batteries recharged or when the data transfer device (220) is connected to a charging station (230) while a data transfer between the geophysical data acquisition device (210) and the data transfer device (220) is still occurring.

Figure 5:
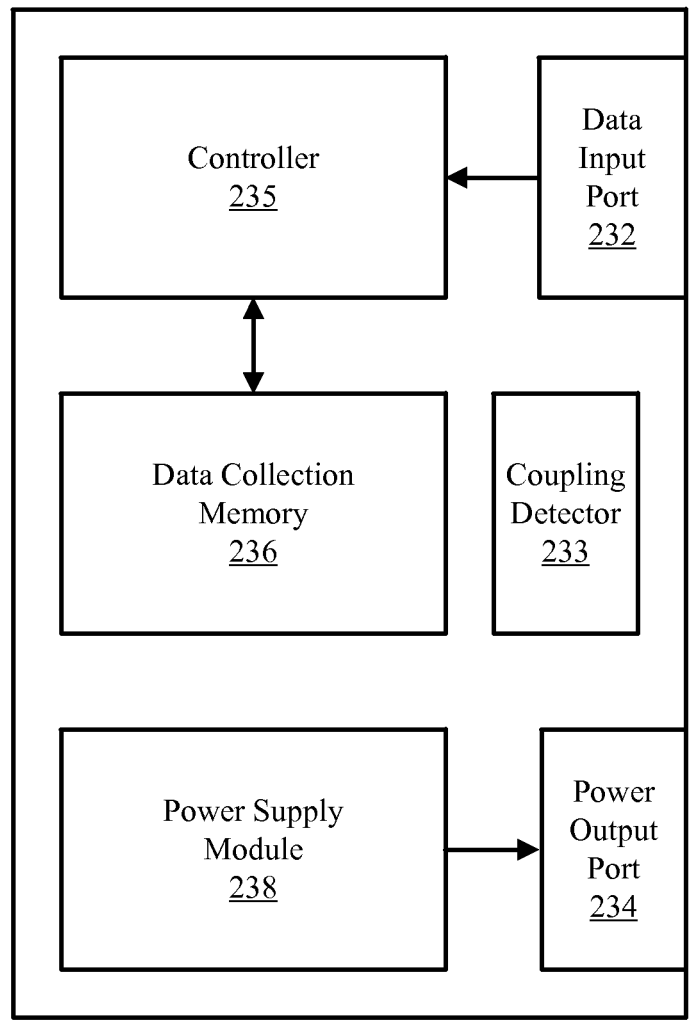
FIG. 5 is a block diagram depicting one embodiment of a charging station.

FIG. 5 is a block diagram depicting one embodiment of a charging station (230). As depicted, the charging station (230) includes a data input port (232), a coupling detector (233), a power output port (234), a controller (235), a data collection memory (236), and a power supply (238). FIG. 5 provides additional details on the charging station (230) over those shown in previous figures.

The data input port (232) may enable the charging station (230) to extract seismic sensor data from a data transfer device (220) or the like. The data collection memory (236) may aggregate such data to enable seismic processing and analysis for a survey environment such as the survey environment (100). The data collection memory (236) may comprise non-volatile storage devices such as flash memory devices or disk storage devices.

The power output port (234) may enable providing power to a data transfer device (220). The power supply module (238) may power the charging station (230) and provide power to an attached data transfer device (220) via the power output port (234).

The coupling detector (233) may detect when the data input port (232) and/or the power output port (234) are coupled to corresponding ports on a data transfer device (220) or the like. The coupling detector (233) may alert the controller (235) when such a coupling occurs.

The controller (235) may initialize the components of the charging station (230) and respond to interrupts generated by those components. For example, the controller (235) may respond to an interrupt generated by the data input port (232) indicating that a data-reception event has occurred. The controller (235) may execute specific functions in response to those events. The controller (235) may be a microcontroller, an embedded state machine, or the like.

Figure 6A:
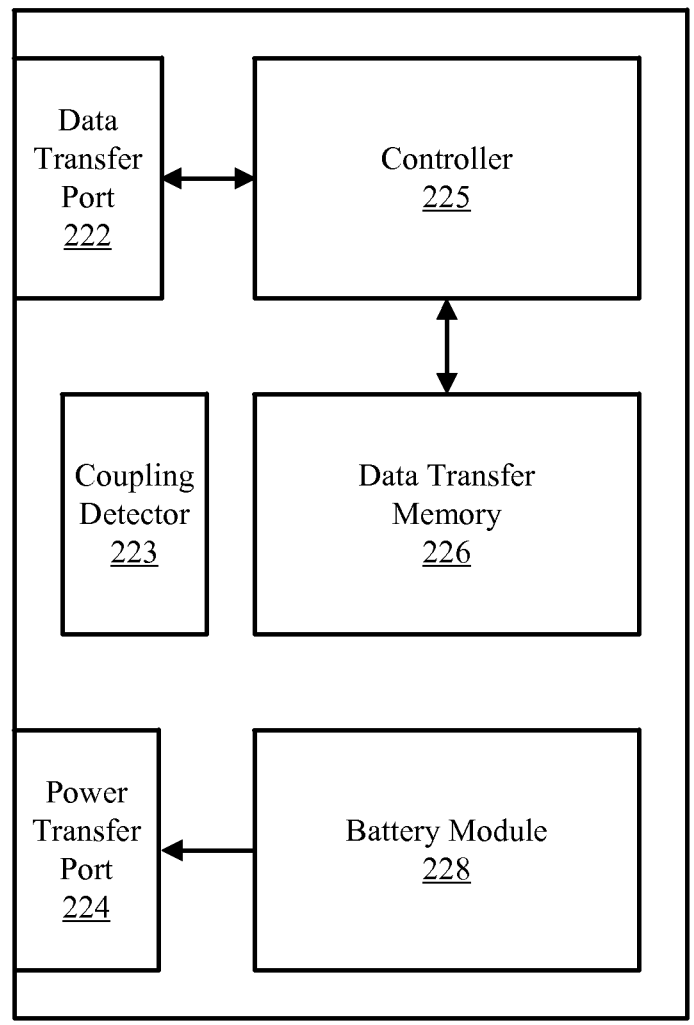
FIGS. 6a-6c are block diagrams depicting several embodiments of a data transfer device.
Figure 6B:
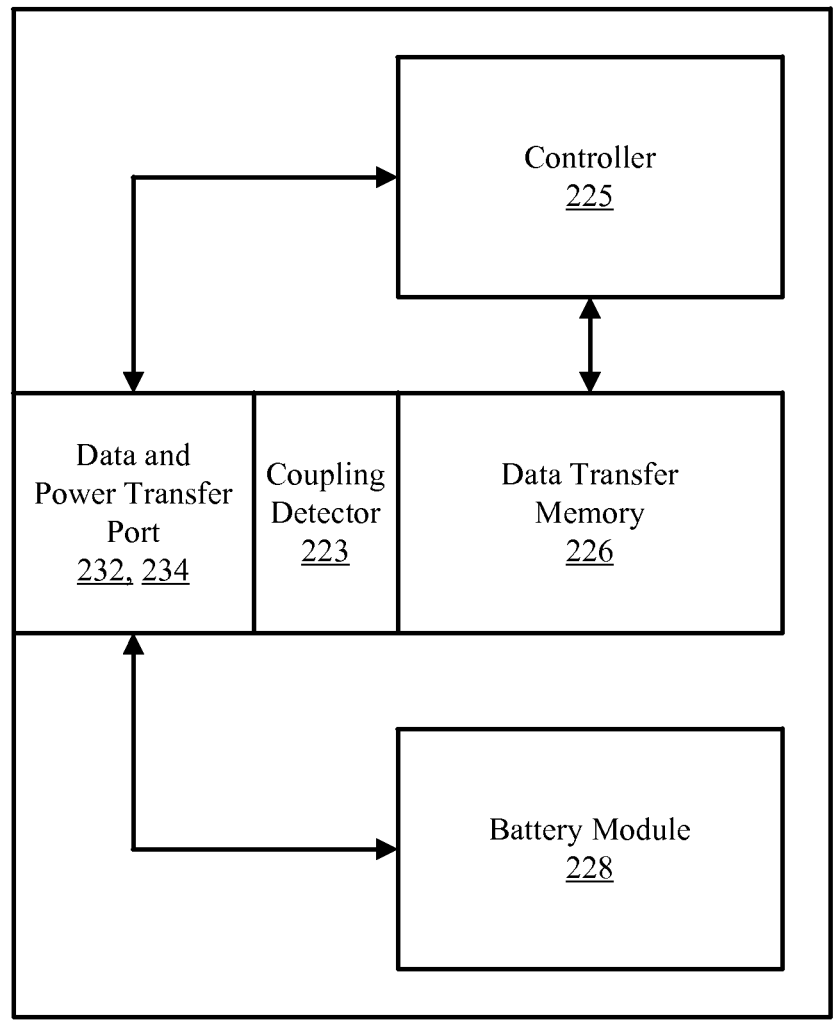
Figure 6C:
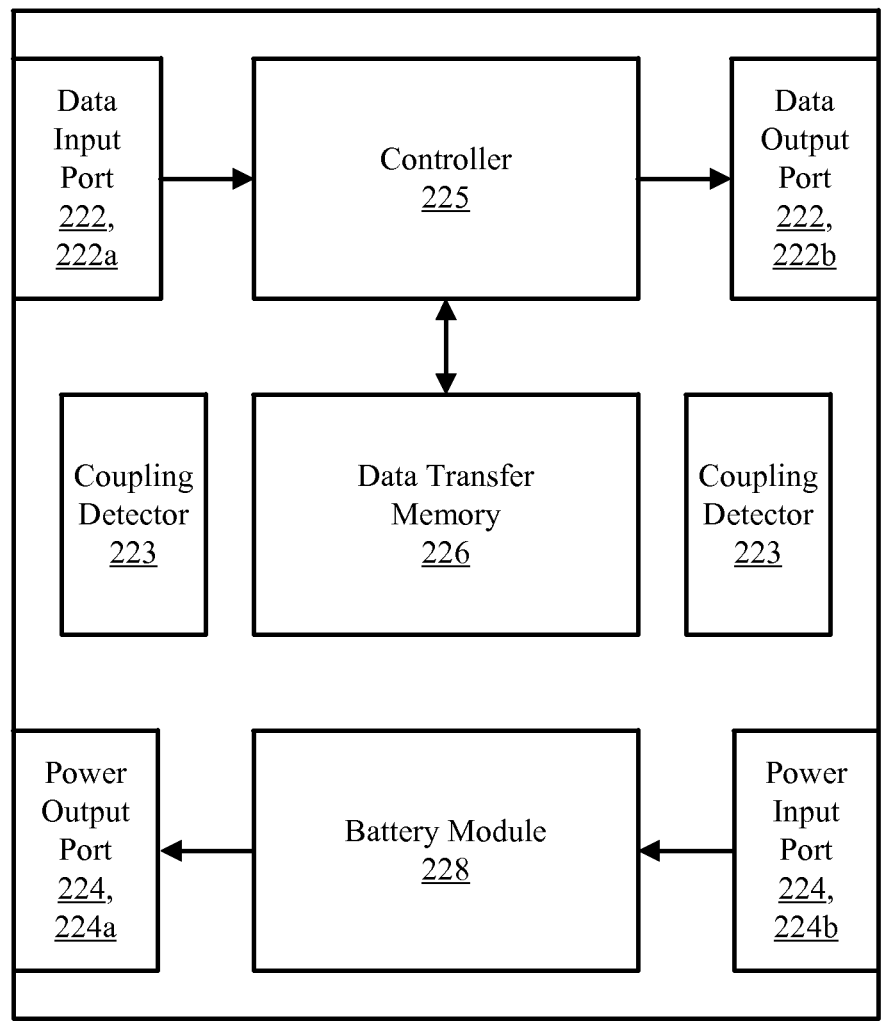

FIGS. 6a-6c are block diagrams depicting several embodiments of a data transfer device (220). FIG. 6a depicts a first embodiment (220a) with separate data transfer and power transfer ports (222) and (224). FIG. 6b depicts a second embodiment (220b) with a combined data transfer and power transfer port (227). FIG. 6c depicts a third embodiment (220c) with the data transfer port (222) partitioned into a data input port (222a) and a data output port (222b). Similarly, the power transfer port in the third embodiment (220c) is partitioned into a power output port (224a) and a power input port (224b). Partitioning the data transfer and power transfer ports may simplify the port circuitry of the device (220c) and enable simultaneous coupling of the data transfer device (220c) to a charging station (230) and a geophysical data acquisition device (210). In addition to the ports (222, 224), each embodiment (200a, 200b, and 200c) may include a coupling detector (223), a controller (225), a data transfer memory (226), and a battery module (228).

The data transfer port (222) may enable the data transfer device (220) to extract seismic sensor data from a geophysical data acquisition device (210). The extracted data may be stored in the data transfer memory (226). The data transfer port (222) may also enable the data transfer device (220) to provide geophysical data to the charging station (230).

The data transfer memory (236) may comprise non-volatile storage devices, such as flash memory devices or disk storage devices that are able to retain data without being powered.

The power transfer port (224) may enable receiving power from a charging station (230), storing power with the battery module (228), and providing power to a geophysical data acquisition device (210). In some embodiments, the power transfer port (224) and the data transfer port (222) are combined into a common port (227) (see FIGS. 2b and 6b). For example, both power and data could be transferred by amplitude, frequency, or phase modulation of an alternating magnetic flux on an inductively coupled port (227). In one embodiment, the reluctance of a magnetic flux path in a power-receiving device (220 or 210) is varied in order to transmit data to a power-transmitting device (220 or 230). The change in reluctance may be sensed by the power-transmitting device (220 or 230) and used to extract a data signal therefrom.

Similar to the coupling detector (213) and the coupling detector (233), the coupling detector (223) may detect when the data transfer port (222) and/or the power transfer port (224) are coupled to corresponding ports on a geophysical data acquisition device (210) or a charging station (230). The coupling detector (223) may alert the controller (225) when such a coupling occurs. In one embodiment, the coupling detector (223) alerts the controller (225) when it senses a change in the inductive loads of the data transfer port (222) and/or the power transfer port (224).

The controller (225) may initialize the components of the data transfer device (220) and respond to interrupts generated by those components. For example, the controller (225) may respond to an interrupt generated by the data transfer port (232) indicating that a data reception or data transmission event has occurred. The controller (225) may execute specific functions in response to those events. The controller (225) may be a microcontroller, an embedded state machine, or the like.

Figure 7:
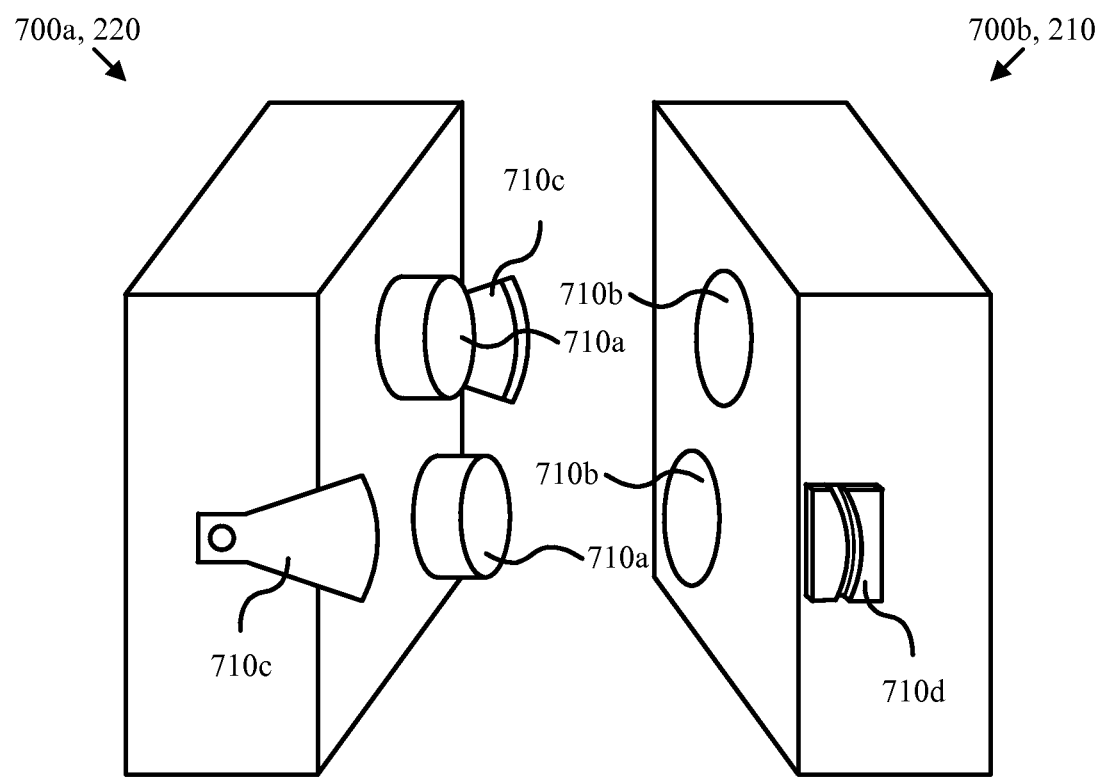
FIG. 7 is a perspective view of attachable cases that may house the geophysical data acquisition device and the data transfer device.

FIG. 7 is a perspective view drawing of attachable cases (700) that may house the geophysical data acquisition device (210) and the data transfer device (220). As depicted, the attachable cases (700) include a first case (700a) and a second case (700b). The depicted attachable cases include a number of mating elements (710) including protrusions (710a), recesses (710b), latches (710c) and a latch receptor (710d). Another latch receptor (710d) is hidden from view.

The mating elements (710) facilitate physically binding the data transfer device (220) to a geophysical data acquisition device (210) or a charging station (230). The attachable cases (700) are one example of providing mating elements (710) that physically bind geophysical data acquisition device (210) and the data transfer device (220). In another embodiment (not shown), the devices (210 and 220) are physically bound by inserting the devices into an enveloping case or the like. In yet another embodiment (not shown), the devices (210 and 220) are physically bound with an adjustable, or elastic, encompassing band. Although certain wireless ports may not require a physical binding of the geophysical data acquisition device (210) to the data transfer device (220) in order to operate, a physical binding may increase the reliability of operation—particularly for inductively coupled ports that operate via near-field effects. Furthermore, physically binding the devices (210 and 220) together may be advantageous in applications where the devices are subject to various disruptive forces such weathering forces and rockslides associated with mountainous locations, and turbulent forces associated with ocean-bottom geophysical surveys. Such disruptive forces may tend to separate the geophysical data acquisition device (210) from the data transfer device (220) if they are not physically bound to each other.

Figure 8A:
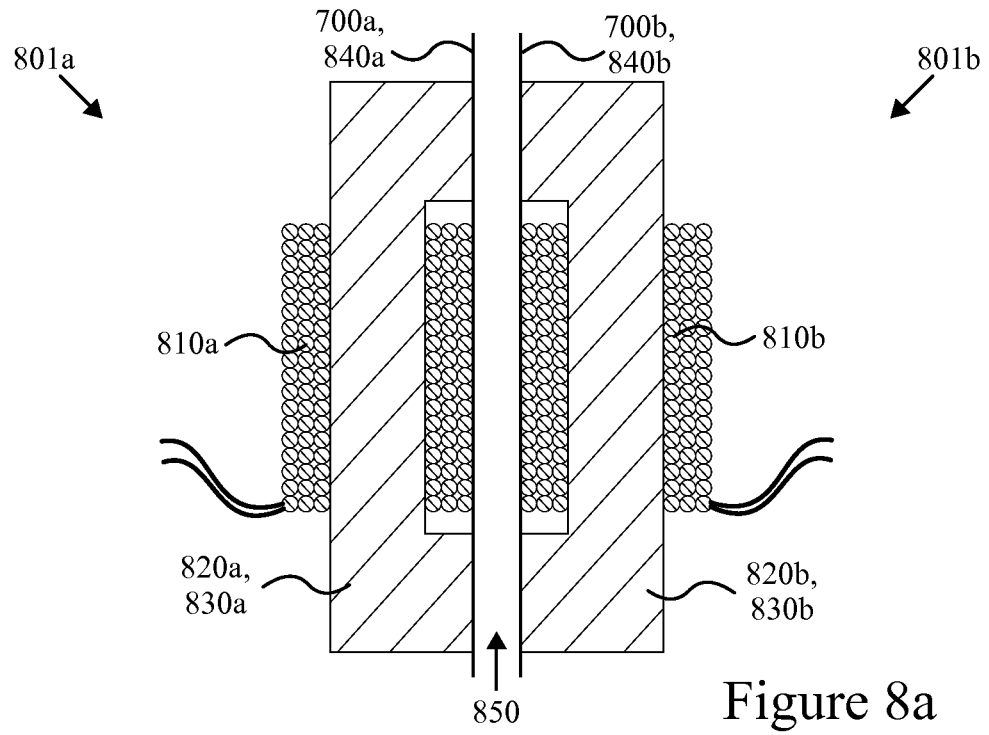
FIG. 8a is a cross-sectional view of an inductive coupler and FIG. 8b is a cross-sectional view of an attachable inductive coupler.
Figure 8B:
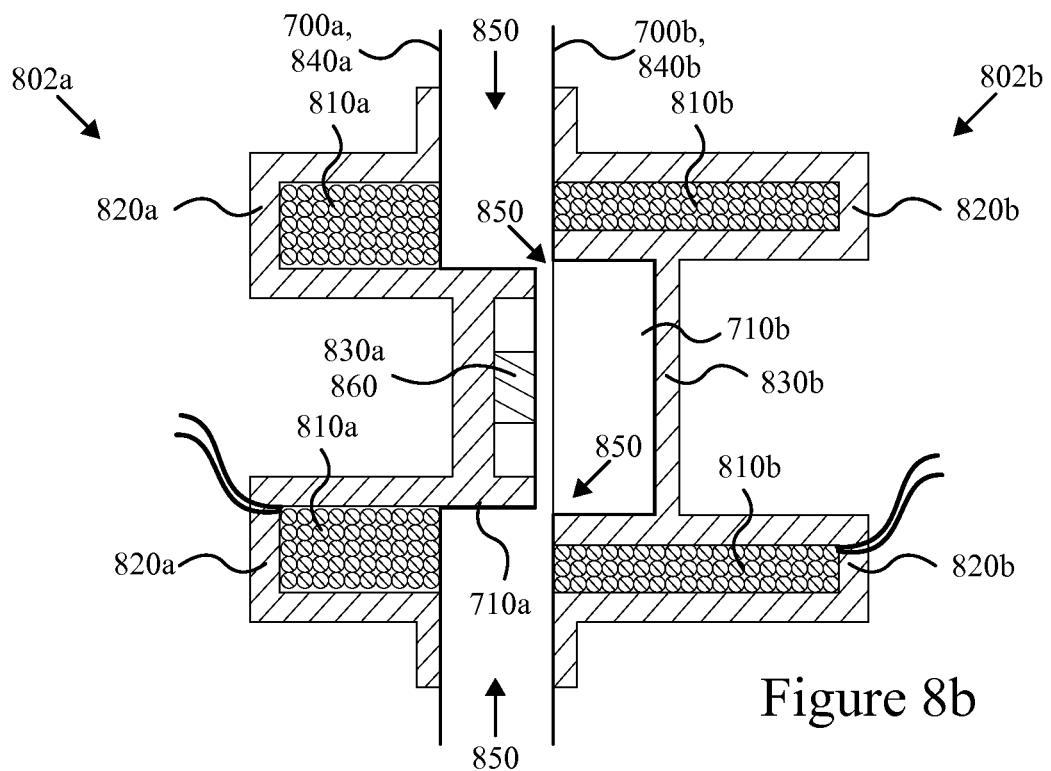

FIG. 8a is a cross-sectional view of an exemplary inductive coupler (801) and FIG. 8b is a cross-sectional view of an attachable inductive coupler (802). As depicted, the inductive couplers (801, 802) include windings (810), soft magnetic cores (820), magnetic elements (830) and case walls (840). Each of the features (801, 802, 810, 820, 830, and 840) are appended with a letter 'a' for a left instance of a particular feature and a letter 'b' for a right instance of the particular feature.

The windings (810) facilitate driving and sensing a magnetic flux that circulates in the magnetic cores (820) while bridging a magnetic gap (850) that results at the interface of the inductive cores with a case wall (840) of the cases (700). Essentially, the windings (810) and magnetic cores (820) provide an inductive coupling between the attachable cases (700) that enables power transfer and data transfer. The magnetic cores (820) may be shaped to increase the cross-sectional area that is proximate to the magnetic gap (850). Increasing the cross-sectional area that is proximate to the magnetic gap (850) may increase the efficiency of the inductive couplers (801, 802).

The magnetic elements (830a, 830b) may be attracted to each other and facilitate aligning the left and right instances of the inductive couplers (801, 802) while also aligning the cases (700) that contain the inductive couplers and holding (i.e., magnetically binding) those cases adjacent to each other. With the inductive coupler (802) of FIG. 8b, a small permanent magnet (860) such as a button magnet enables magnetic attraction of the magnetic elements (830a, 830b) and holding the devices adjacent to each other, without activating one of the coils (810). In contrast, magnetic attraction of the (soft) magnetic elements (830a, 830b) only occurs in the inductive coupler (801) of FIG. 8a, when one of the coils (810) is activated (e.g., in order to transfer power and/or data between the devices). Thus, the permanent magnet (860) may provide a minimum magnetic binding force between adjacent cases (700) and potentially eliminate or reduce the need for the mating elements (710). The size of the permanent magnet (860) may be selected to be sufficiently small to avoid saturating the magnetic cores (820) with magnetic flux previous to activating one of the coils (810).

One of skill in the art will appreciate that the construction of the inductive couplers (801, 802) is essentially that of a transformer where the windings are separated enough to isolate each side (a, b) from each other, but allow the magnetic coupling to occur through the case walls (840a, 840b), which may formed from a non-magnetic material such as plastic. One of skill in the art will also appreciate that the cases (700a, 700b) may provide a waterproof barrier that enables deployment of the geophysical data acquisition device (210), and the data transfer device (220), in harsh environments. Furthermore, one of skill in the art will appreciate that successful power transfer and data transfer may occur between the devices (210 and 220) with, or without, a physical binding of the devices to each other via the mating elements 700, or the like.

FIG. 9 is a block diagram of a deployment and maintenance system (900) for geophysical sensing. As depicted, the deployment and maintenance system (900) includes deployment equipment (910), robotic equipment (920), data aggregation devices (930), data processing equipment (940), one or more data analysis workstations (950), and a data communication network (960). The deployment and maintenance system enables deployment and maintenance of the geophysical sensing nodes (110).

Referring to FIG. 9, while still referring to FIGS. 7 and 8, the waterproof and connector-free coupling provided by the inductive couplers (801, 802), or similar wireless ports disclosed herein, in conjunction with waterproof cases such as the cases (700a and 700b), may enable deployment of autonomous geophysical sensing nodes (110) in a variety of environments (100) including land, shallow water, and deep water environments.

For example, in a shallow water application a number of geophysical sensing nodes (110) could be formed by coupling a geophysical data acquisition device (210) to a data transfer device (220) and deployed by conventional means. The conventional means may include using deployment equipment (910) such as hole boring equipment to drill holes for deploying the nodes (110) underground within the survey environment (100). In addition to conventional means, the robotic equipment (920) may facilitate placement of the sensing nodes (110).

The deployed coupled devices (210, 220) would then function as autonomous nodes (110) and symbiotically acquire data with each data transfer device (220) transferring power to a corresponding geophysical data acquisition device (210) and each geophysical data acquisition device (210) sending data to the data transfer memory (226) of the corresponding data transfer device (220).

Providing power to, and collecting data from, the nodes (110) may include dispatching a technician (not shown), or the robotic equipment (920), to access the geophysical sensing nodes (110). When each geophysical sensing node (110) is accessed, a charged (and empty of data) data transfer device (220a) could then be swapped for the exhausted (and potentially full of data) data transfer device (220b), and the autonomous node (110) quickly redeployed.

The exhausted data transfer device (220b) potentially filled with data, would then be attached to a charging station (230), or the like, to have its data copied and the battery recharged using the same inductive ports (802) as originally used while acquiring data. The benefit of this approach is that no electrical connector is required, allowing underwater systems to be completely sealed and land systems to be more impervious to snow, sand, water, or the like. Thus, the ability to transfer real-time data as it is acquired to a data transfer device (220) that can be quickly exchanged results in essentially zero down-time for the data acquisition functions provided by the node (110) and may enable keeping the node (110) in place during the exchange operation.

The geophysical data collected from each exhausted data transfer device (220b) by a charging station (230) may then be aggregated by one or more data aggregation devices (930), processed by the data processing equipment (940), and analyzed by geophysicists or the like at one or more data analysis workstations (950). In addition to enabling deployment of autonomous geophysical sensing units to a variety of environments with the same modular unit (110), the solutions described herein enable geophysical data acquisition and aggregation in multiple environments (100) simultaneously, with the same modular unit.

For example, as shown in FIG. 1, which is essentially incorporated into FIG. 9 as the survey environment (100), the seismic source (120) may generate a wave that propagates through the subsurface of the earth. The subsurface structure of the earth within the survey environment (100) may reflect the wave generated by the seismic source resulting in multiple reflected images of seismic source (120) propagating within the subsurface. Each geophysical sensing node (110), whether on land, in shallow water, or in deep water, may record a unique waveform that is a summation of delayed versions of the original generated wave and the reflected images. The geophysical sensing nodes (110) may be configured to only record data that exceeds a selected energy level, or the like. In such a manner, the geophysical sensing nodes (110) could remain in place for extended periods of time collecting only data that is relevant to analysis.

At an appropriate point in time, a technician, or a robotic vehicle (920), may visit each autonomous node (110) and swap-in a charged data transfer device (220). The use of a robotic vehicle (920) may be preferred in harsh or remote environments. In some embodiments, the data acquisition device (210) has sufficient capacitive energy and data memory storage that the exchange of data transfer device (220) can occur without disrupting the recording capability of the autonomous node (110). Once the technician or the robotic device returns to a charging station (230) or the like, the data stored on each retrieved data transfer device can be aggregated for analysis as previously described.

One of skill in the art can appreciate the simplicity of the various embodiments provided herein and the many benefits provided thereby. For example, the embodiments described herein enable the uploading of acquired geophysical data concurrent with recharging the batteries needed for deployment. The embodiments described herein also enable faster redeployment, reduced maintenance costs, and elimination of the need for electrical connectors and the issues that plague electrical connectors, such as data loss due to poor coupling and/or physical element intrusion. Furthermore, by deploying autonomous nodes, the issues and costs related to installing and maintaining data collection cables are eliminated. Thus the embodiments presented herein provide additional incentive to deploy autonomous nodes in geophysical sensing applications.

The embodiments disclosed herein provide methods, systems and apparatuses for collecting data from, and providing power to, geophysical data acquisition devices. It should be understood that this description is not intended to limit the invention. On the contrary, the described embodiments are intended to cover alternatives, modifications and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the disclosed embodiments are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for collecting data from, and providing power to, a geophysical data acquisition device, the method comprising:
    inductively coupling a data transfer device to a geophysical data acquisition device, wherein the geophysical data acquisition device is deployed on land or water to record seismic data;
    collecting data from the geophysical data acquisition device to the data transfer device via a data transfer port and providing power from the data transfer device to the geophysical data acquisition device via a power transfer port; and
    inductively coupling the data transfer device to a charging station, to transfer the data from the data transfer device to the charging station via the data transfer port and receive power by the data transfer device from the charging station via the power transfer port,
    wherein the collecting of the data and the providing of the power between the data transfer device and the geophysical data acquisition device occurs wirelessly while the data transfer device is inductively coupled to the geophysical data acquisition device, and
    the data is transferred wirelessly and the power is received wirelessly between the data transfer device and the charging station while the data transfer device is inductively coupled to the charging station.

2. The method of claim 1, wherein the data transfer port and the power transfer port are inductively coupled ports.

3. The method of claim 1, wherein the power transfer port is configured to inductively couple to a power input port of the geophysical data acquisition device.

4. The method of claim 1, further comprising:
    replacing the data transfer device with a newly charged data transfer device.

5. An apparatus for collecting data from, and providing power to, a geophysical data acquisition device, the apparatus comprising:
    a data transfer port configured to wirelessly receive data from a data output port of a geophysical data acquisition device when the data transfer port is proximate to the data output port, and wirelessly transmit the data to a data input port of a charging station when the data transfer port is proximate to the data input port, wherein the geophysical data acquisition device is deployed on land or water to record seismic data;
    a data transfer memory configured to store the data received by the data transfer port and retrieve the data for transmission by the data transfer port;
    a power transfer port configured to provide power to a power input port of the geophysical data acquisition device when the power transfer port is proximate to the power input port, and wirelessly receive power from a power output port of the charging station when the power transfer port is proximate to the power output port; and
    a battery module operably connected to the power transfer port.

6. The apparatus of claim 5, wherein the power transfer port is configured to inductively couple to the power output port of a charging station and the power input port of a geophysical data acquisition device.

7. The apparatus of claim 5, wherein the data transfer device comprises:
    one or more mating elements that facilitate coupling the data transfer device to the geophysical data acquisition device or the charging station.

8. The apparatus of claim 7, wherein the mating elements comprise a latch.

9. The apparatus of claim 7, wherein the mating elements comprise at least one magnetic element that is attracted to a corresponding element on the geophysical data acquisition device or the charging station.

10. The apparatus of claim 5, wherein the data transfer device comprises a coupling detector configured to detect when the data transfer device is proximate to the geophysical data acquisition device or the charging station.

11. The apparatus of claim 5, wherein the power transfer port comprises a power input portion and a power output portion that are spatially distinct and the data transfer device may be simultaneously coupled to a geophysical data acquisition device and a charging station.

12. A system for collecting data from, and providing power to, a geophysical data acquisition device, the system comprising:
    the geophysical data acquisition device configured to interface with one or more sensors and acquire data therefrom, the geophysical data acquisition device including a power input port and a data output port, wherein the geophysical data acquisition device is deployed on land or water to record seismic data;
    a data transfer device having:
        a data transfer port configured to wirelessly receive data from the data output port when the data transfer port is proximate to the data output port, and wirelessly transmit data to a data input port when the data transfer port is proximate to a data input port,
        a data transfer memory configured to store data received by the data transfer port and retrieve data for transmission by the data transfer port,
        a power transfer port configured to provide power to the power input port when the power transfer port is proximate to the power input port, and wirelessly receive power from a power output port when the power transfer port is proximate to a power output port, and
        a battery module operably connected to the power transfer port; and a charging station having:
        a data input port configured to wirelessly receive the data from the data transfer device,
        a data collection memory configured to store the data, and
        a power supply module configured to wirelessly provide power to the data transfer device via a power output port.

13. The system of claim 12, further comprising:
    robotic equipment for deploying or maintaining the geophysical data acquisition device.

14. The system of claim 12, further comprising:
data processing equipment for processing data acquired by the geophysical data acquisition device.

15. The system of claim 12, further comprising:
one or more data analysis workstations for analyzing data acquired by the geophysical data acquisition device.

\* \* \* \* \*